United States Patent
Altman et al.

[11] 3,854,822
[45] Dec. 17, 1974

[54] ELECTRO-OPTICAL SCANNING SYSTEM FOR DIMENSIONAL GAUGING OF PARTS

[75] Inventors: Norman G. Altman, White Plains, N.Y.; Marc G. Dreyfus, Stamford, Conn.

[73] Assignee: BAI Corporation, Stamford, Conn.

[22] Filed: June 27, 1973

[21] Appl. No.: 374,113

[52] U.S. Cl. ............... 356/156, 356/160, 356/168, 356/171, 178/DIG. 36
[51] Int. Cl. ........................................... G01b 11/00
[58] Field of Search .......... 356/156, 158, 160, 167, 356/168, 171; 250/571; 178/DIG. 36

[56] References Cited
UNITED STATES PATENTS
3,224,322  12/1965  Westbrook .................. 356/160 UX

*Primary Examiner*—John K. Corbin
*Assistant Examiner*—Paul K. Godwin

[57] ABSTRACT

An electro-optical system for gauging the dimensions of a machined part to determine whether the part meets predetermined standards. The system includes a scanner having a sensitive face onto which is projected an image of the outline of the part being measured. Scan voltages for the scanner are developed by a scan generator to create a scan whose shape, position and length are controllable to define a scan path which traverses those edges of the image of the part outline which constitute the terminal points of a dimension to be measured, thereby causing the scanner to yield a video signal representing this dimension. The video signal acts to gate a clock generating pulses at a constant rate, so that the clock produces a train of pulses in the time interval between these terminal points. The number of pulses in the train is counted to produce a test count representing this time interval and this count is compared with a reference count stored in a register, the reference count representing the nominal value of the dimension being measured, the comparison resulting in an output signal indicating the disparity between the dimension measured and the nominal value thereof. Calibration means are provided to modify the scan voltages to correct for the optical and electronic non-linearities of the system with respect to each dimension measured.

14 Claims, 23 Drawing Figures

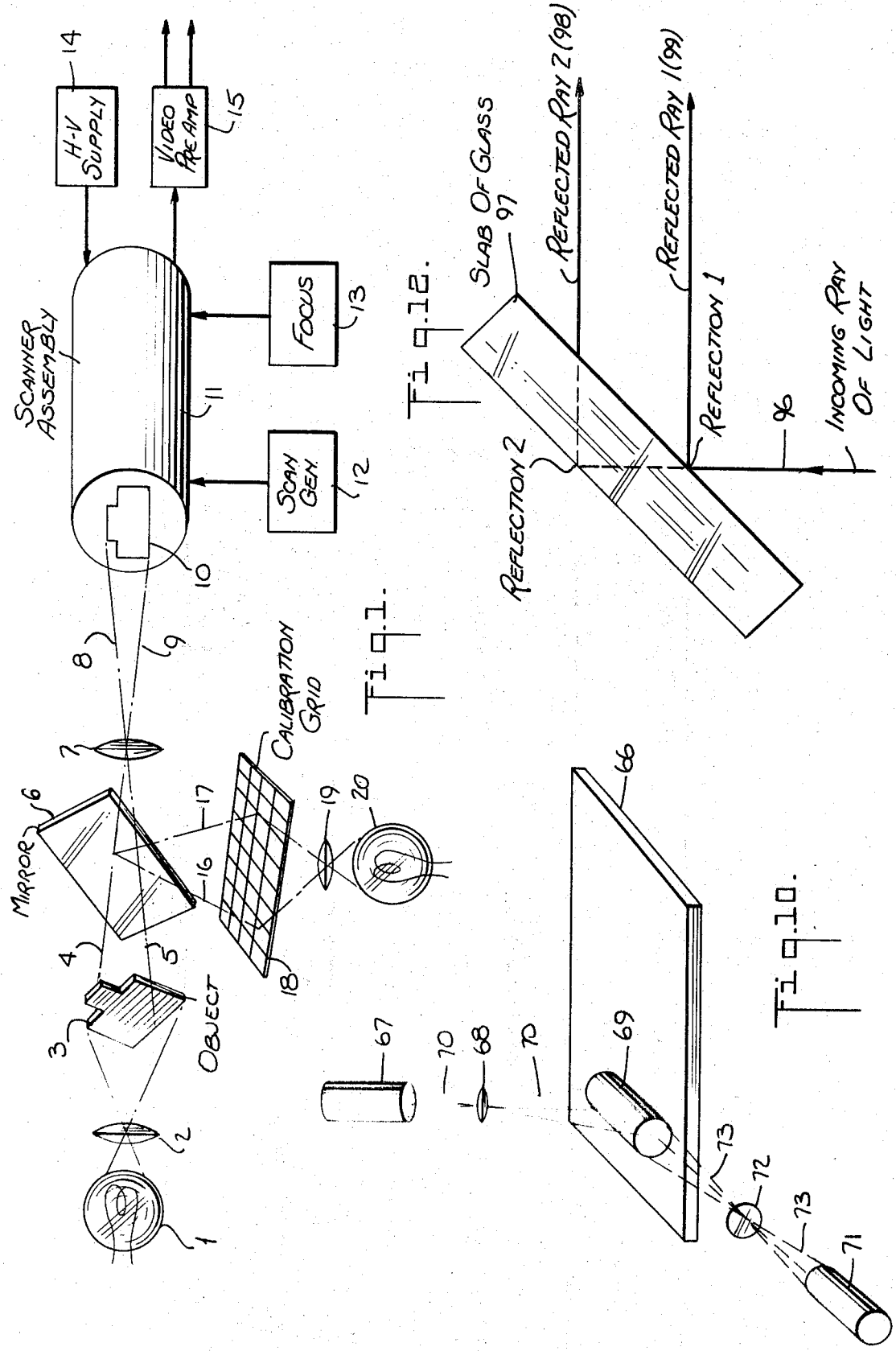

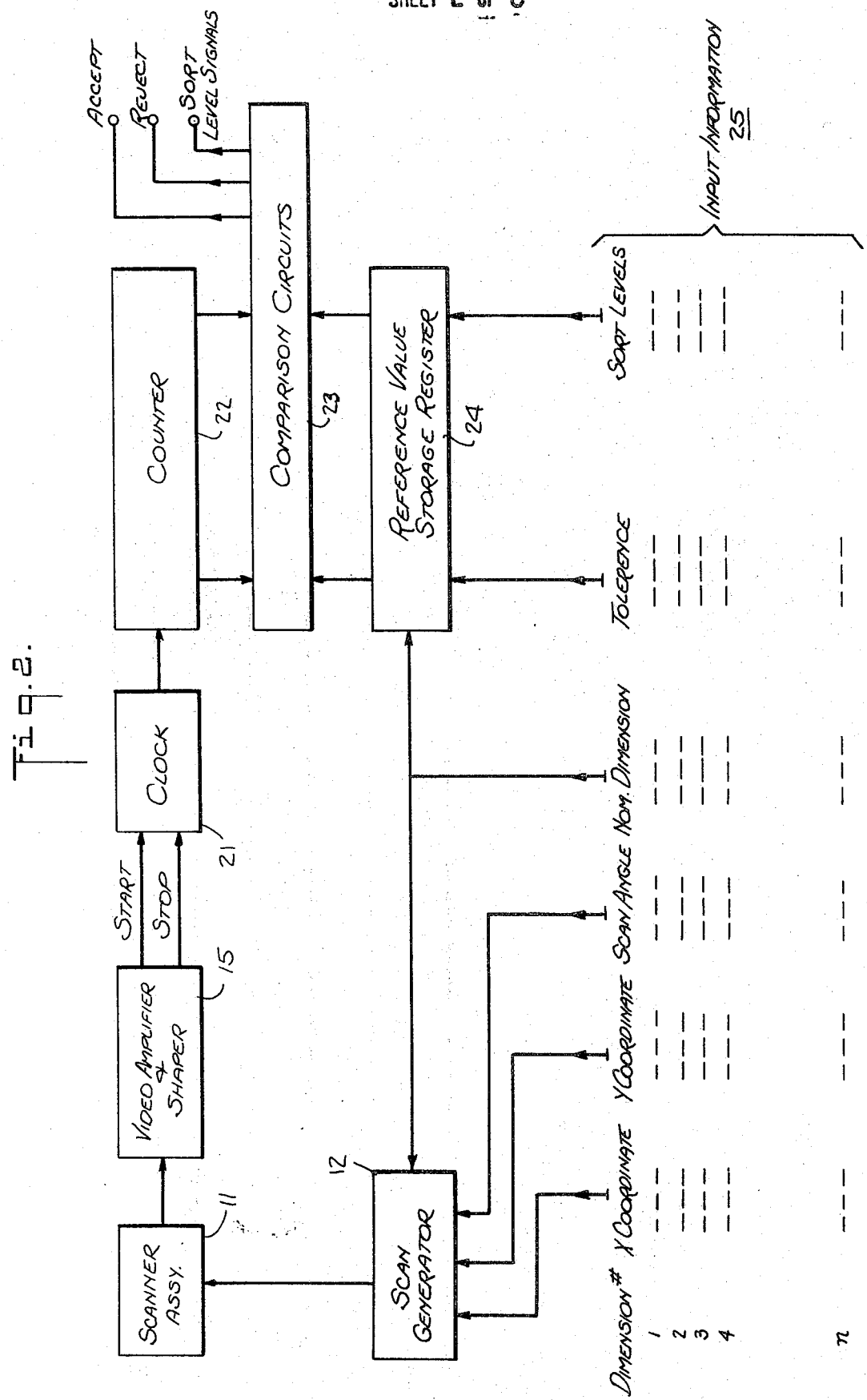

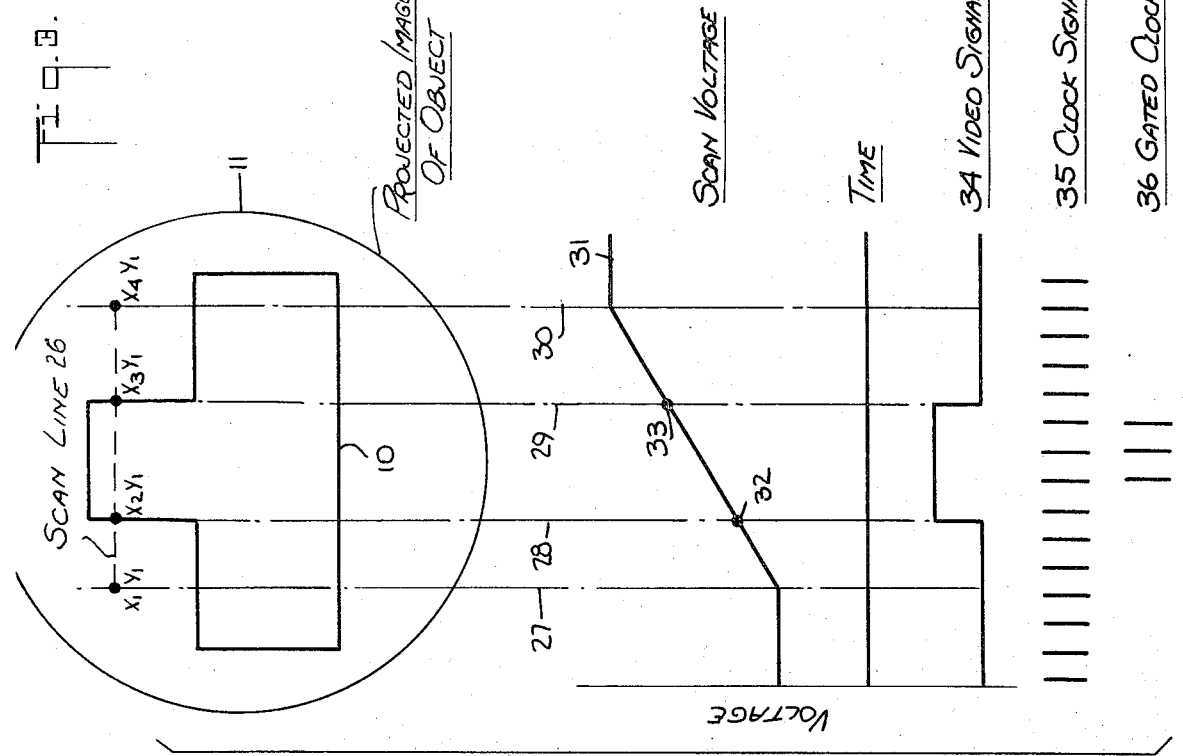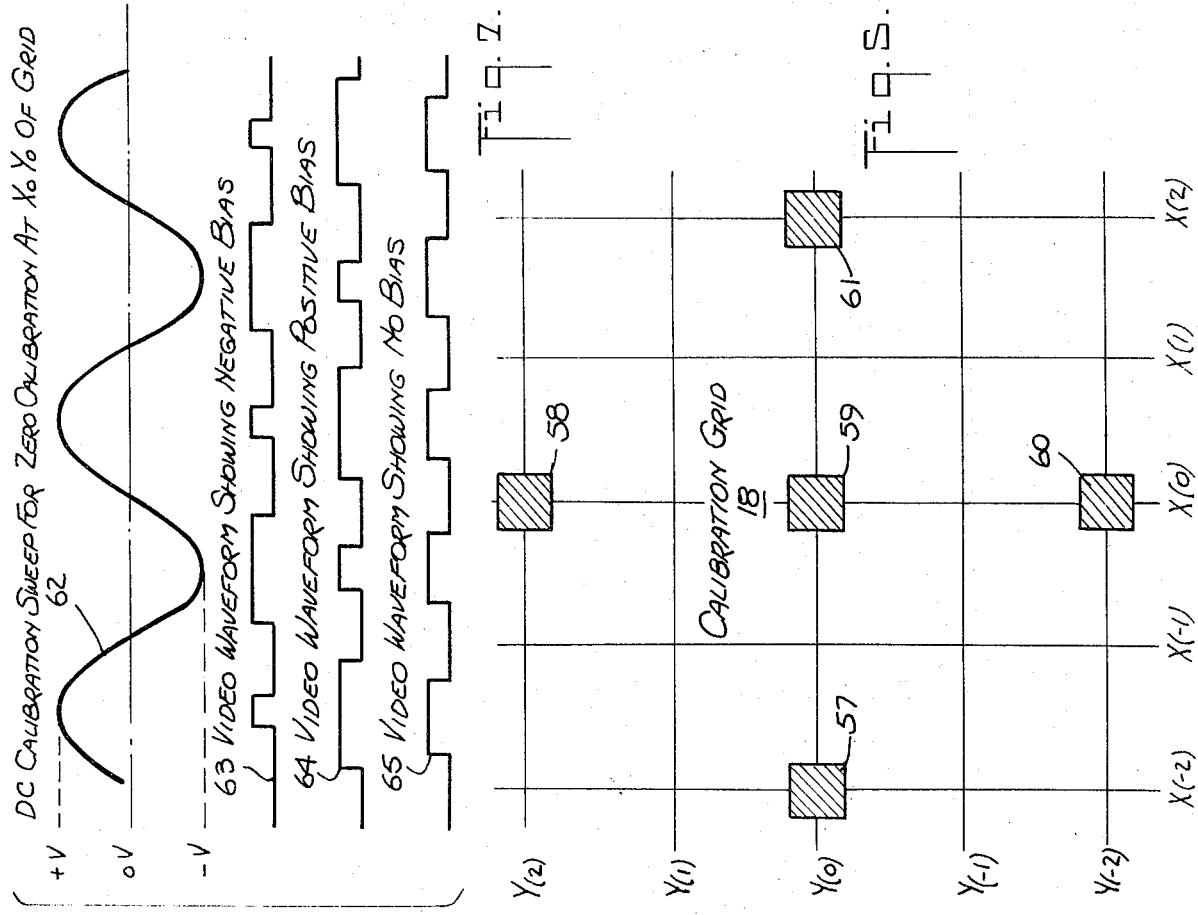

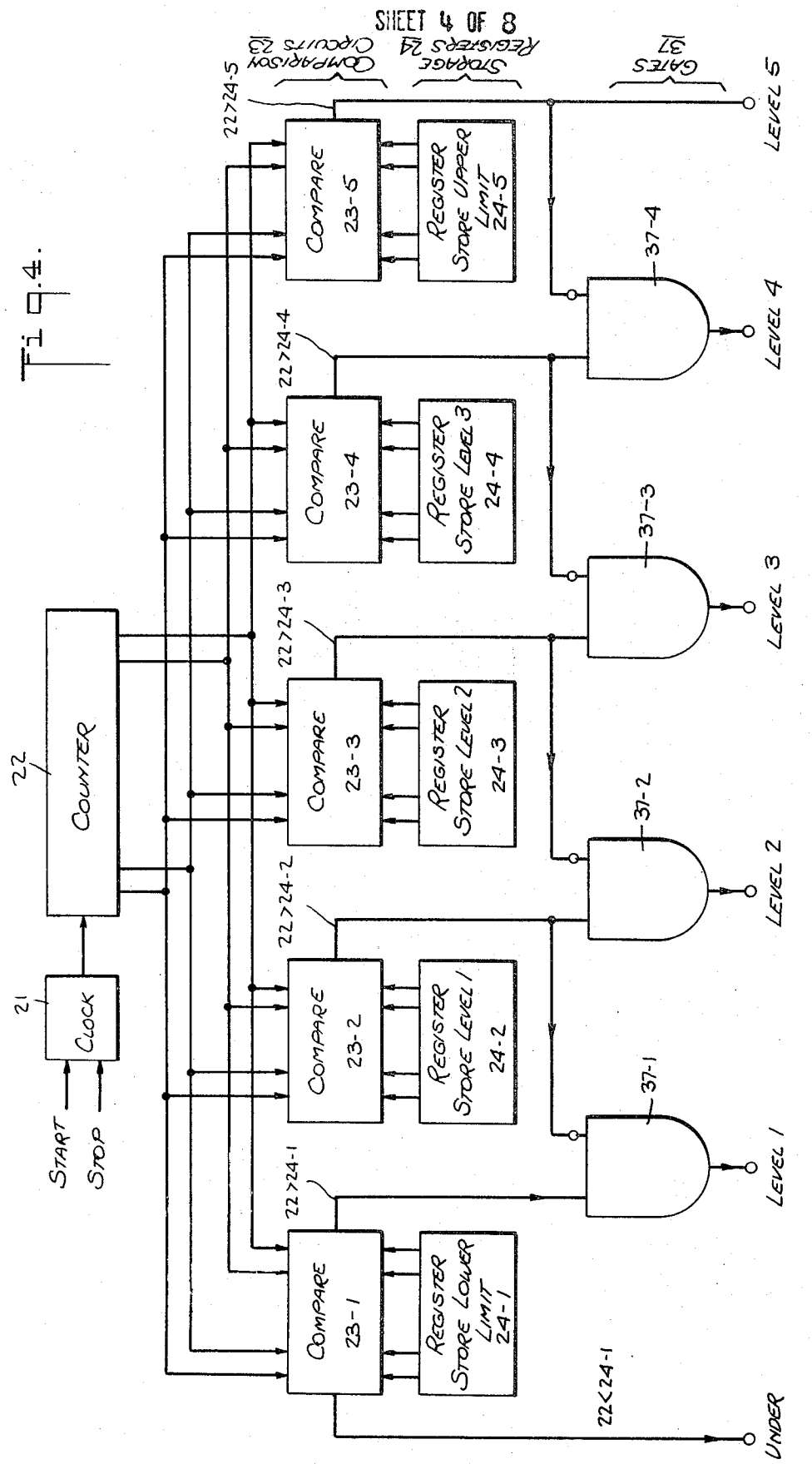

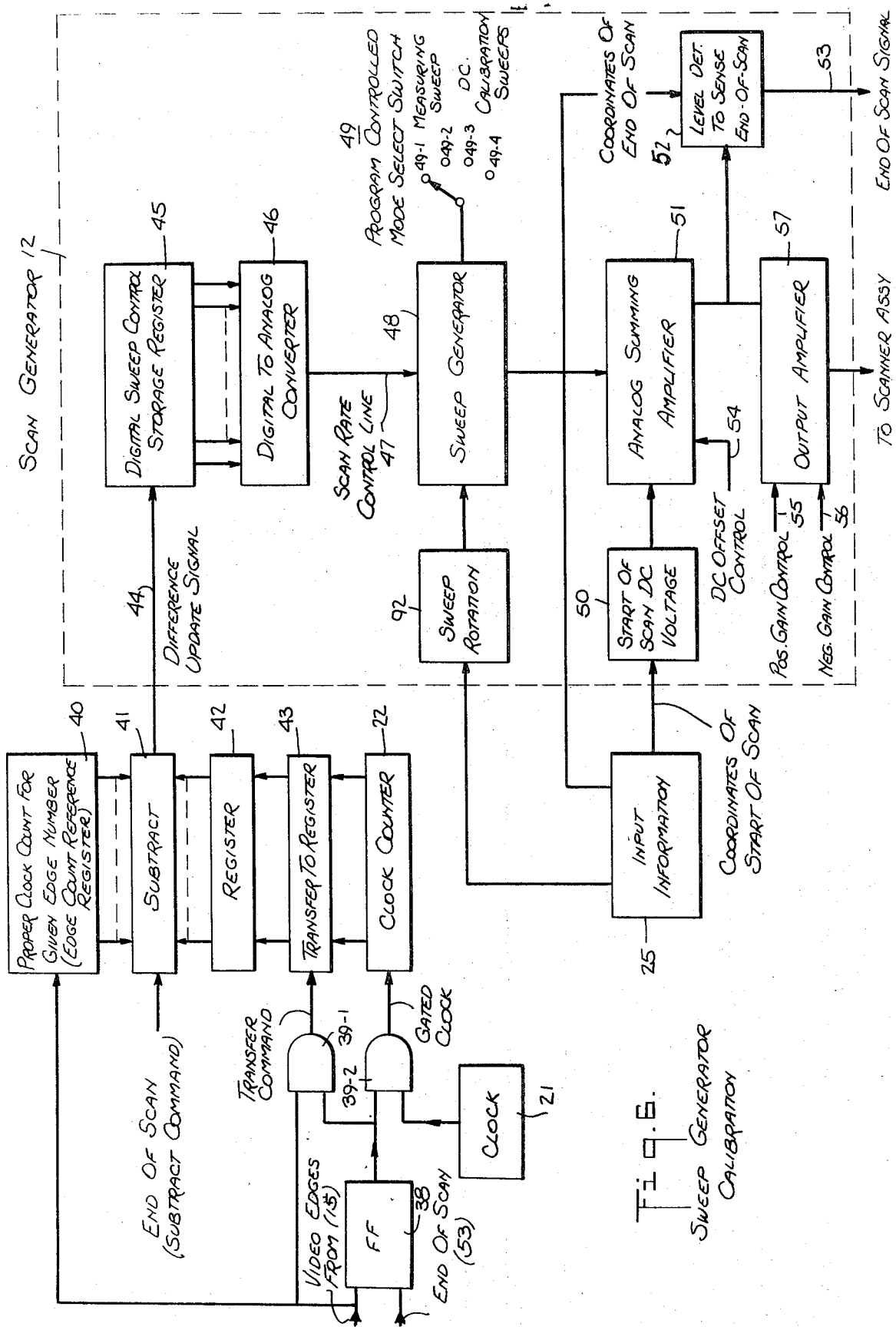
Fig. 6. Sweep Generator Calibration

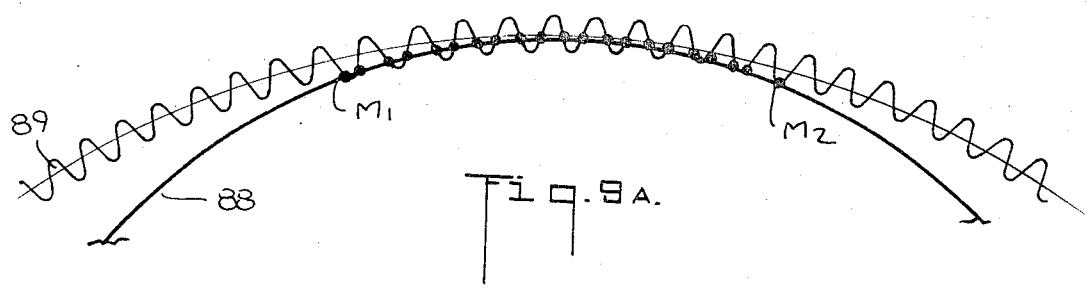
Fig. 9A.
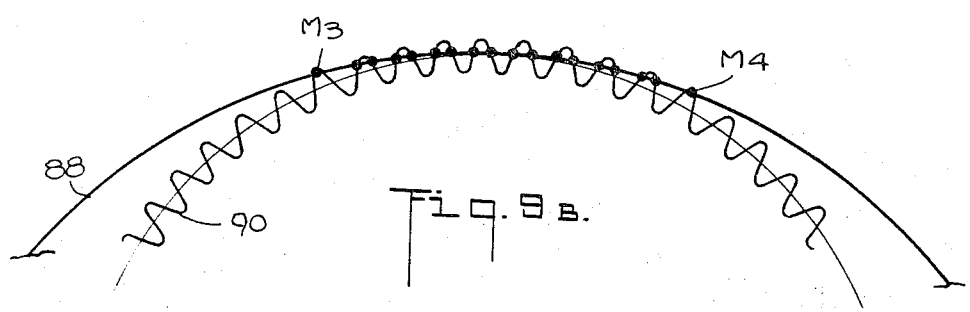
Fig. 9B.
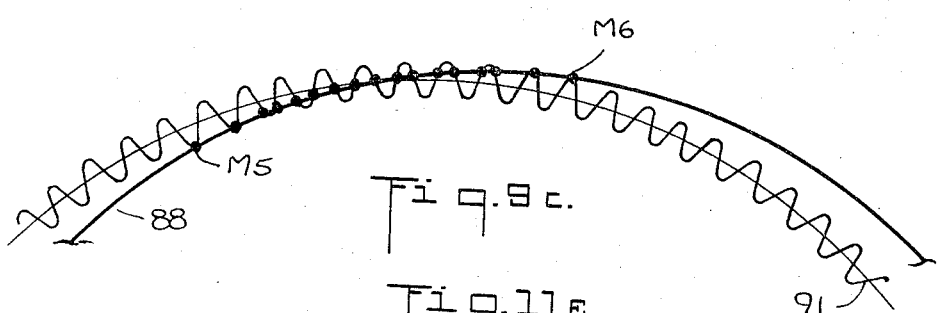
Fig. 9C.
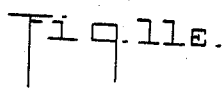
Fig. 11E.
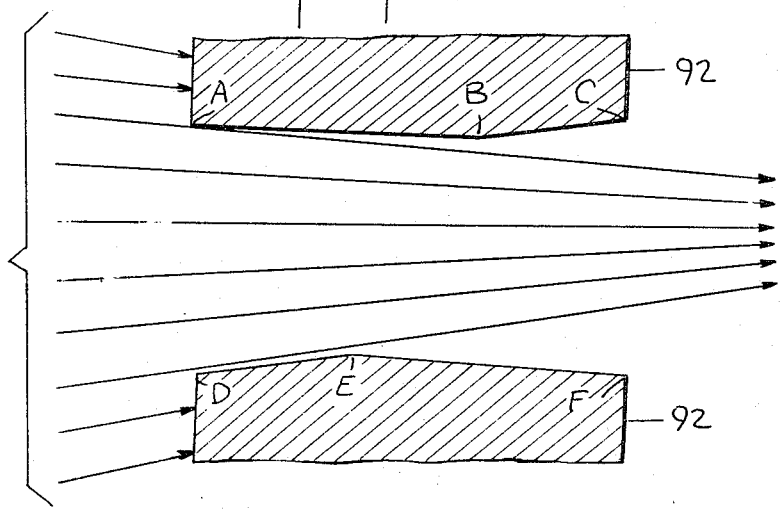

COLLIMATED LIGHT (PARALLEL RAYS) 93

DIVERGENT RAYS OF LIGHT 94

ELECTRO-OPTICAL SCANNING SYSTEM FOR DIMENSIONAL GAUGING OF PARTS

BACKGROUND OF THE INVENTION

This invention relates generally to electro-optical systems for gauging the dimensions of individual parts or assemblies thereof, and more particularly to a system including a calibration grid for calibrating the entire field of view, the measurement and calibration effected for each dimension being individually controlled by a stored digital program.

Modern manufacturing technology makes possible the production and assembly of parts at an extremely rapid rate, even to the extent of thousands of units per minute. There is however no commercially feasible technique capable of automatically and accurately gauging the dimensions of the manufactured parts at the same rapid rate to determine whether they meet all dimensional tolerances.

The common practice therefore is not to individually measure each part or assemblies thereof, but to inspect samples taken from the production line. But available inspection rates are inadequate and do not support a meaningful inspection program when the unit production rate is very high. And even when the sampling rate is satisfactory, it does not provide assurance that each and every part satisfies all dimensional requirements. In those situations where the manufactured part is intended to perform a critical function, individual inspection is mandatory.

Traditional devices for gauging fabricated parts, such as micrometers, height gauges and dial indicators all involve physical contact with the part. The gauging procedure requires a trained operator and is often difficult and time consuming. The widely used optical comparator technique in which a silhouette of the part is projected on a magnified scale onto a reference screen, also requires a trained operator and is subject to measurement errors due to eye fatigue, poor judgment, and other factors. The rate of gauging by an optical comparator is limited by the ability of the operator to see and evaluate the image on the screen with respect to a reference outline.

In order to overcome the limitations of gauging procedures which entail human operators, non-contacting electronic scanning devices have been devised which employ an electro optics device such as a vidicon tube or an image dissector tube. These tubes include a sensitive cathode and are adapted to scan an image of the object projected thereon to produce a video output that represents the dimension of the object being scanned. Among the advantages gained by the use of electronic scanning systems are the following:

A. Dimensions are obtainable at a point remote from the part being gauged without the need for physical contact therewith;

B. Measurements may be made to ascertain part dimensions which are not readily accessible.

C. Individual dimensions can be measured at very high speeds.

D. Because there is no need for a physical shift to take measurements at different coordinate positions on a single unit, there is effectively no dead time between such measurements. The time it takes to shift from one coordinate position to the next is limited only by the response time of the electronic scanner system and is usually in the order of a few microseconds.

E. The precision of measurement, expressed as a percentage of full scale, is independent of the size of the part being inspected. Compensation for variations in acceptable object size is effected simply by changing the magnification of the optical system which presents an image of the object to the scanner.

Despite the advantages inherent in electronic scanning systems for gauging machined parts and other fabricated objects, electronic scanning systems of the type heretofore known have not enjoyed significant commercial success, for such systems cannot be relied on to make accurate measurements. A major reason for this lack of success is that existing systems are incapable of compensating for distortions encountered in the electronic circuits of the systems and for non-linearities in the sweep and in the optics.

In an ideal scanning system in which there is zero distortion of the optics and in the scan parameters, and in which time is infinitely divisible with no ambiguity due to system noise and other variables, the system is theoretically capable of measuring the required dimension with any desired degree of accuracy or resolution. But since an actual system is inevitably subject to various distortions and ambiguities, noise and quantizing errors, the accuracy of the measurement is impaired thereby.

SUMMARY OF THE INVENTION

In view of the foregoing, it is the main object of this invention to provide an improved electro-optical scanning system for measuring the dimensions of parts or assemblies thereof, which system includes calibration means to compensate for distortion arising in the optics, in the scan parameters and in the associated electronics.

More particularly it is an object of this invention to provide a measuring system of the above-type which includes a two-dimensional calibration grid affording calibration for the entire field of view, the grid being mounted in object space to facilitate calibration for all bias drifts and non-linearities of the measuring system, including non-linearities in the optics of the system. A significant advantage which flows from the use of a calibration grid is that it makes possible a technique for calibrating the absolute position of established coordinates separately from the differential measurements used to establish lengths.

Also an object of this invention is to provide a system of the above-type wherein the measurements which are carried out and the calibrations which are effected for each measurement are individually controlled by a stored digital program whereby under the command of the program, measurements can be performed anywhere within the field of view of the system. Within this field of view, no limitation exists as to the length of the dimension to be measured or its slope with reference to an arbitrarily determined set of coordinates.

In a system according to the invention, the digital program stores the nominal coordinates of the dimension to be measured and the acceptable tolerance range for this dimension. The program determines whether the measuring system will act on a straightforward "go" or "no-go" basis to accept or reject the part, or whether the system will sort parts into separate categories depending on the tolerance band within which the controlling dimensions fall.

The number of dimensions which can be measured on a given part is limited only by the capacity of the memory which holds the program. When multiple dimensions are measured on a simple piece, the machine can be programmed to accept the piece when all dimensions lie within the assigned tolerances, or upon rejecting the piece for an out-of-tolerance dimension, to produce a signal indicating which dimension was found to be unacceptable. This signal can be used to sort parts into separate bins in accordance with the dimension found to be out of tolerance.

By using stored subroutines, the measuring system can be made to perform standard multiple measurements of the type appropriate to the inspection and measurement of machined or otherwise fabricated parts or assemblies. Thus by the use of a stored subroutine, one is able to find the coordinates and diameter of all holes visible in the field of view of the system. And by another subroutine one can determine the roundness of each of these holes. The conformance of the holes to any other desired shape whose perfect dimensions can be established as a reference can be determined by yet another subroutine. With further subroutines one can ascertain the concentricity of parts, the pitch diameter of spur gears and of threaded pieces as well as the tooth-to-tooth error of most hobbed parts.

Because of the flexibility of the electronic scan, the electro-optical measuring system can be programmed to use scan patterns that are optimized for particular measuring functions, such as determining the radius of curvature and the center of curvature of curved surfaces. For this purpose the system can establish the position of these centers of curvature in space and make measurements from these positions to other points within the system field of view.

In a system in accordance with the invention, the fundamental metric is based on the counting of pulses generated by a high precision clock, whereby each measurement results in a digital count equal to the time expressed in the number of clock pulses required for the calibrated scan to traverse the distance in the image plane whose dimension is required. Thus all decisions and communications with outside agencies can be made on a purely digital basis, and tolerances, sorting levels, "go" and "no-go" decisions and the establishment of coordinates are all determined digitally.

The system can be used to perform several functions and as an example, the following two functions can be carried out simultaneously or independently:

A. Making on-line, real time decisions for accepting, rejecting, and sorting measured parts.

B. Furnishing complete data showing the measured values of all parts examined to a properly programmed digital computer. Coordinated in this way, the measuring device and the computer can determine and control dimensional and tolerance trends that are occurring in the course of manufacturing the parts being tested within the acceptable band of tolerances. The data derived from such analysis can be used to initiate the resetting of machine tools, the changing or repairing of cutting tools, and in general, to predict and thereby obviate the production of parts having out-of-tolerance dimensions.

In the case of assembly operations rather than individual parts, the gauging problem is more difficult to solve by conventional means because in many cases the assembly process adds parts which obscure the area of the assembly that needs to be measured or inspected to insure that the overall assembly has been made properly. Frequently, because of this obscuration, the completed assembly cannot be fully inspected to insure that it has been properly assembled without first dismantling the unit. An automatic gauging device can be used to inspect partially completed assemblies to determine that all assembly operations prior to the inspection point have been made properly. If such inspection stations are introduced just prior to each assembly step which will obscure an area that requires inspection, the entire assembly can be fully inspected without the necessity for disassembly to examine obscured parts. It is therefore another object of this invention to provide means for measuring partially or fully completed assemblies to determine that they have been assembled properly up to the point where the measurement is made.

Briefly stated these objects are accomplished in an electro-optical system for gauging the dimensions of a machined part or other fabricated object or assemblies thereof to determine whether the part meets predetermined standards. The system includes an electro-optical scanner such as an image dissector tube having a photocathode onto which is projected an image of the outline of the part being measured. Scan voltage for the tubes are developed by a scan generator to create a scan whose shape, position, and length are controllable to define a scan path which traverses those edges of the image of the part outline which constitute the terminal points of a dimension to be determined; thereby causing the scanner to yield a video signal representation thereof.

The video signal acts to gate a precision clock such as a piezoelectric crystal oscillator generating periodic pulses, whereby the clock yields a train of pulses in the time interval between the terminal points. The number of pulses in the train is counted to produuce a test count representing this time interval. Information regarding the nominal values of the several dimensions to be measured is supplied to a reference value storage register, and the test count is compared with the appropriate nominal value count to produce an output signal indicative of the disparity therebetween, which signal determines whether the part is to be accepted or rejected. Calibration means including a calibration grid whose image is projected onto said photocathode in place of said part outline, serve to modify the scan voltages to correct for the optical and electronic non-linearities of the system with respect to each dimension measured.

OUTLINE OF THE DRAWING

For a better understanding of the invention as well as other objects and features thereof, reference is made to the following detailed description, to be read in conjunction with the accompanying drawing, wherein:

FIG. 1 is a schematic diagram of the optical arrangement for projecting an image of a part being gauged or of the calibration grid, onto the sensitive cathode of a scanner assembly in an electro-optical system in accordance with the invention, for gauging the dimensions of parts;

FIG. 2 is a block diagram of the electronic system adapted to control the scan shape and position and to process the information contained in the video signal yielded by the scanner shown in FIG. 1;

Figure 8A:
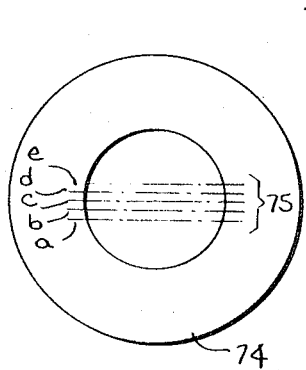

FIG. 3 graphically illustrates the relationship existing between the gated clock pulses and the video signal developed by the system shown in FIG. 2;

FIG. 4 is a block diagram illustrating in greater detail certain elements of the system shown in FIG. 2 to explain how accept and reject signals are produced as well as signals representing various tolerance levels;

FIG. 5 separately illustrates the calibration grid.

FIG. 6 is a block diagram of the circuits for calibrating the sweep of the scanner by means of the calibration grid;

FIG. 7 graphically shows the waveforms resulting from examining a calibration block placed on the calibration grid;

FIGS. 8A to 8G illustrate the manner by which certain part dimensions are examined by special subroutines;

FIGS. 9A to 9C illustrate the manner by which the radius of curvature and the center of curvature may be determined by other special subroutines;

FIG. 10 shows schematically the scanning arrangement for tracking moving parts to be measured;

FIGS. 11A to 11E illustrate a collimated light technique to control the illumination of a part to be measured; and FIG. 12 illustrates a preferred technique for measuring the thickness of a transparent object.

DESCRIPTION OF INVENTION

THE OBJECT SCANNER

Referring now to FIG. 1, there is shown schematically an arrangement in accordance with the invention for examining an object 3 in order to generate video information from which one can derive the measurement data of interest. Object 3 is shown in the form of a machine-made part having a generally rectangular shape whose upper edge is provided with a tab extension. It will be appreciated that this shape is merely by way of simplified illustration and that in practice the object may have a much more complex configuration.

Object 3 is illuminated by a suitable high-intensity light source 1 whose rays are focused on the object by a lens 2. Object 3 is inserted in the path extending between light source 1 and the sensitive photocathode of a scanning assembly 11; hence it is only the profile or contour of the object which is projected. The multitude of projected rays is typified by light rays 4 and 5 which are directed toward a lens 7 and emerge therefrom as rays 8 and 9. These rays impinge on the light sensitive surface of scanner assembly 11 to create thereon an image 10. This surface takes the form of a photocathode in a photomultiplier. This projected image is a replica of the profile of the object 3 and therefore takes the form of a silhouette.

Interposed between object 3 and lens 7 is an inclined, semi-reflecting plate 6 functioning as a beam splitter that separates the rays from the object into two beams, one passing successively through plate 6 and lens 7 and being directed toward the scanner assembly, the other beam being reflected by the plate and being disregarded. In practice, in lieu of a plate, one may use a beam-splitter cube composed of two right angle prisms joined together, the hypotenuse of one prism being coated with a semireflecting layer. A thin semi-reflecting plate is sometimes objectionable because of ghosting or astigmatism unless used with parallel light rays.

Also associated with beam splitter 6 is a second light source 20 whose light is focused by a lens 19 onto the rear of the beam splitter through a transparent calibration grid 18, the rays impinging on the beam splitter being represented by rays 16 and 17. When light source 20 is turned on and light source 1 is turned off, the illuminated grid formed of intersecting equispaced vertical and horizontal lines is presented to the photocathode of scanner assembly 11. Thus, the photocathode sees either the silhouette of the object being examined or the calibration grid, depending on which light source is active.

The photomultiplier included in the scanner assembly is preferably of the image dissector type, such as that described in my prior patent 3,593,286 wherein the photocathode, in response to incident light, emits photoelectrons which are projected onto the plane of a defining aperture. Operatively associated with this aperture is an electron multiplier and a deflection system for deflecting the electron image over the defining aperture in a manner whereby the various portions of the image are examined in a desired sequence.

Thus, the photomultiplier is provided with a set of deflection coils, one for vertical and the other for horizontal deflection, and a focusing coil. A scan generator 12 supplies deflection voltages to the set of coils and a focus generator 13 supplies current to the focusing coil. A high voltage supply 14 connected to the photomultiplier, supplies the required operating potentials thereto. The output of scanner assembly 11 is fed to a pre-amplifier and wave shaper 15 whose video output represents the scanned image of the silhouette of object 3 or the calibration grid 18, depending on which light source is operative.

THE SCANNER CONTROL SYSTEM

Referring now to FIG. 2, there is shown the electronic system that is adapted to control the scan shape and position and to process the information contained in the video signal yielded by scanner assembly 11. The video output of scanner assembly 11 is first processed in video amplifier and wave shaper 15 to generate start and stop signals capable of gating a high precision clock 21 which produces periodic pulses at a predetermined constant repetition rate.

The fundamental standard of measurement or metric of the system is based on the counting of pulses generated by the clock, each measurement producing a number in digital form. The count is equal to the time expressed in the number of clock pulses required for the calibrated scan to traverse the distance in the image plane whose dimension is being measured. Thus, the dimension itself is directly expressed in digital form. As a consequence, all decisions and all communication with agencies external to the system can be made on a purely digital basis. Tolerance, sorting levels, "go" and "no go" decisions, and the establishment of coordinates are all determined digitally.

The operative relationship between the shaped video signal and the gated clock 21 is illustrated in FIG. 3. A projected image 10, which is the silhouette of the object 3, appears on the photocathode of scanner assembly 11, as shown in the uppermost section of this figure. In order to scan this image along a scan line 26 which starts at a point determined by coordinates $X_1$-$Y_1$ and traverses the image to finally terminate at point $X_4$-$Y_1$, a voltage waveform 31 is generated to produce the desired scan line. Waveform 31 represents changes in voltages plotted against time.

The relationship in time between voltage wave form 31 and scan line 26 is indicated by vertical projection lines 27, 28, 29, and 30 which extend therebetween. At the instant represented by projection line 27, the scan voltage brings scan line 26 to its starting point $X_1$-$Y_1$. At a subsequent instant, represented by projection line 28, the scan voltage brings scan line to point $X_2$-$Y_1$ which is the leading edge of the tab extension of the object silhouette. At a later instant, represented by projection line 29, the scan voltage brings the scan line to point $X_3$-$Y_1$ which is the trailing edge of the tab on the image. Finally, at the instant represented by projection line 30, the scan voltage brings the scan line to its termination point $X_4$-$Y_1$.

The intersection of projection line 28 with the scan voltage is indicated by point 32 on the voltage waveform, and the intersection of projection line 29 with this form is indicated by point 33. These two points represent the start and stop of a period during which the scanner is traversing the unlit area or silhouette of the tab extension portion T of the image. During this period a video signal is generated which undergoes a first inflection at the instant represented by projection line 28 and a second inflection at the instant represented by projection line 29.

In this video signal, as shown in waveform 34, the positive portion represents the object silhouette to the extent scanned by line 26, and the negative portion on either side of the positive portion is indicative of the lighted background. The positive portion of waveform 34 represents a binary logic ONE signal which enables the clock signal (represented by continuous pulses 35) during the interval when the projected scan is traversing the image to be measured from point $X_2$-$Y_1$ to point $X_3$-$Y_1$. The pulses developed during this interval (represented by pulse train 36) constitute the output of the gated clock 21 and are fed to a counter 22 (FIG. 2). This counter adds up the number of pulses in train 36 to produce a count expressing the dimension measured by scan line 26.

As shown in FIG. 2, counter 22 is operatively coupled to a set of comparison circuits 23 which act to compare this count with reference values held in a storage register 24. This register accepts and uses the nominal value of the dimensions to be measured, its allowable tolerance and the levels at which sorting is to take place.

With these inputs available from register 24, the comparison circuits function to determine the relationship between the values stored in the register and the dimensions represented digitally by counter 22. The output of comparison circuits 23 takes the form of signals which state that the object being examined is to be accepted or rejected. It also indicates at what sorting level the object is to be placed should further sorting be desired that goes beyond a simple accept/reject decision.

Input information represented by an input matrix 25 is supplied to the system to indicate the X and Y coordinates along which measurements are to be made for particular dimensions (dimensions 1 to n), the scan angle at which these measurements are to be made and the nominal dimension and tolerances for these dimensions. In practice, this information may be supplied by a large bank of digital switches, such as those of the thumb-wheel switch type manufactured by Electronic Engineering Co. of Calif. Or one can use an input device similar to a reader for IBM punched cards, punched paper tape or a similar bulk digital storage medium.

A small dedicated mini-computer and its associated memory may be used for the purpose of supplying the required information. Normally a straight line scan will be used at an angle chosen to perpendicularly intersect the edges of the required dimension whose length is determined by measuring the time it takes to traverse the distance from one edge to the other.

The X coordinates and Y coordinates along which measurements are to be made and the scan angle of measurement are fed from matrix 25 into scan generator 12. These serve to control the position at which the measuring scan is to be effected in the system coordinate axis, the angle at which it is to be made. By means of the "nominal dimension" input to the scan generator, the length of the scan which is to be used to make the measurement is determined.

INFORMATION PROCESSING

FIG. 4 illustrates the manner in which information from gated clock 21 is used by counter 22 in conjunction with the respective comparison circuits 23-1 to 23-5 to produce accept and reject signals as well as signals representing various levels (levels 1 to 4) for sorting by dimension.

Information from input matrix 25 (FIG. 2) is transferred to a bank of storage registers 24-1 to 24-5 which respectively cooperate with the bank of comparison circuits 23-1 to 23-5. Storage register 24-1 stores the lowest limit below which the part being analyzed is deemed not acceptable, while storage register 24-5 stores the highest limit above which the part is deemed not acceptable. The intermediate storage registers 24-2, 24-3 and 24-4 store intermediate levels for sorting purposes.

The output of gated clock 21 is fed into counter 22 and the count attained by the counter at the end of the scan, is compared in comparison circuits 23-1 to 23-5 with values entered in the various storage registers 24-1 to 24-5. If the count is less than that stored in storage register 24-1, then yielded in the output line marked 22 < 24-1 of comparison circuit 23-1 is a logic ONE, indicating that the dimension measured is UNDER that stored in register 24-1.

If the output of first comparison circuit 23-1 indicates that the count produced by counter 22 is greater than the level stored in register 24-1, then an output is yielded by the line marked 22 > 24-1 which is applied to the first gate 37-1 in a bank 37 thereof which produces a logic ONE indicative of level 1.

If the comparison shows that the value in counter 22 is greater than that stored in register 24-2, then the output of comparison circuit 23-2, which is a logic ONE and appears on the line marked 22 > 22-2, is applied to a second gate 37-2 whose output is a logic ONE, indicative of level 2. It is to be noted that the logic ONE output of comparison circuit 23-2 on line 22 > 24-2 is read back as an inhibit input to the first gate 37-1 to produce a logic ZERO output, for the dimension is now at level 2 and the logic must indicate this fact unequivocally. Similarly, the 22 > 24-3 line applies an inhibit input to the second gate 37-2, the 22 > 24-4 line applies an inhibit input to the third gate 37-3 and the 22 > 24-5 line applies an inhibit input to gate 37-4.

In a similar manner, comparisons are made with values stored in registers 24-3, 24-4 and 24-5 to yield logic ONE output in Gates 37-3 and 37-4 indicative of levels 3 and 4 respectively. The uppermost level 5 is yielded in the output line marked 22 > 25-5 of the comparison circuit 23-5.

CALIBRATION GRID

Referring now to FIG. 5, calibration grid 18 is illustrated in highly simplified form. It will be seen that the grid is composed of equi-spaced horizontal lines ($Y_{(2)}$, $Y_{(1)}$, $Y_{(0)}$, $Y_{(-1)}$, and $Y_{(-2)}$) which are intersected by equi-spaced vertical lines ($X_{(-2)}$, $X_{(-1)}$, $X_{(0)}$, $X_{(1)}$, and $X_{(2)}$). Thus coordinate point $X_{(2)}$-$Y_{(1)}$ in FIG. 3 lies at an intersection of these lines.

A block 58 is placed at the intersection of $Y_{(2)}$-$X_{(0)}$, and blocks 57, 59, 60, and 61 are placed at other intersections. These blocks make possible measurements serving to calibrate the gain and DC offset of the sweep circuitry to insure that the commanded sweep position is really the one being used in making the measurement.

In actual practice, the calibration grid 18 will have many more vertical and horizontal lines than those shown in FIG. 5. A convenient practical number is 50 horizontal lines intersecting 50 vertical lines to define a grid which when projected on the photocathode of the scanner assembly, will generate an image whose dimensions are approximately 1 inch by 1 inch, and in which the grid lines are spaced 0.020 inches apart.

With each of these grid lines generating an image of about 0.003 inches wide, the deflectable photo multiplier used will determine the position of the leading and trailing edges of each line to a precision of 0.0001 inches, using a scanning aperture with a physical diameter of 0.0008 inches and edge-enhancing techniques of the type well known in the art.

With a basic linearity of the scanner plus the optical assembly in the order of 0.1 percent, calibration effected by a 50 by 50 line grid of the type described, using edge enhancement techniques to define edge position to a precision of 0.0001 inches, will result in a system that can be calibrated to measure to the basic accuracy of the grid ±0.01%.

Inasmuch as grids are commercially obtainable with accuracies approaching 0.001 percent, the accuracy of the present system with a grid of this commercial type is effectively 0.01 percent.

SWEEP GENERATOR CALIBRATION CIRCUIT

Referring now to FIG. 6, there is shown in block diagram the circuits for calibrating the sweep by means of the calibration grid. The calibration technique makes it necessary to position the scan at about the position at which the measurement is to be made and then illuminating the calibration grid so that the image thereof appears on the photocathode of the image dissector tube instead of the part to be measured.

The grid image is scanned to an extent covering about the same distance as that of the nominal dimension of the part to be measured. The number of edges which are traversed on the calibration grid by the scan indicates the number of clock pulses which should be counted between the first and last grid edge. Any discrepancy between the actual number of clock pulses counted and the "ideal" number which should be received, is used to calibrate the sweep generator so that the combined errors of the system electronics, the sweep non-linearities and the lens non-linearities are compensated for by the measurement made on the grid. Moreover additional measurements are made at blocks 57 to 61 on the calibration grid to calibrate the gain and DC offset of the sweep circuitry to ensure that the chosen sweep position is actually the one being used in making the measurement.

The operation of the sweep generator calibration arrangement is as follows:

When the sweep traverses the image of the grid in either the X or Y direction, video pulses are generated for each crossing of a grid line. These edge pulses are amplified and shaped by video amplifier and shaper 15 (FIG. 2) and are applied simultaneously to a flip-flop 38, an edge count reference register 40 and a gate 39-1. In setting flip flop 38, the first video edge from amplifier 15 also enables gate 39-1. Gate 39-1 allows subsequent video edges to command the transfer-to-register device 43, so that at the time each video edge subsequent to the first edge appears, the count from clock counter 22 is transferred through device 43 to storage register 42.

Each video edge, after the first thereof, also advances edge count reference register 40, so that this register contains the number of clock counts which a perfectly calibrated system would find between the first video edge and the nth video edge. It is to be noted that the number of clock pulses which should appear between the first and nth video edge is part of the basic system calibration and is therefore a wired-in calibration number.

The end of a scan generated by scan generator 12 is sensed by a level detector 52 which produces a signal 53 that is applied to flip flop 38 to reset the device. Thus at the end of the scan, with flip flop 38 reset, register 40 holds the "proper count" which clock counter 22 should have generated from the first to the nth video edge. The algebraic difference between the number stored in reference register 40 and the number stored in register 42 is determined in subtract device 41 whose output on line 44 is a measure of the error in terms both of magnitude and sign. This error is used as a difference update signal to update the digital sweep control storage register 45 in scan generator 12.

The digital output of register 45 is converted into a corresponding analog value by means of a digital-to-analog converter 46 whose output, which appears on line 47, is applied to sweep generator 48, whereby register 45 acts to control the rate of the sweep. As a consequence, the sweep rate is corrected so that should one repeat the calibration sweep the number stored in register 42 would now agree precisely with the number stored in reference register 40. The system is then ready to take a measurement on the part to be measured at the coordinates and sweep length for which it has just been calibrated.

The calibration procedure described thus far, governs the time required to scan from one calibration line to another on the image of the calibration grid, but it does not calibrate the positional accuracy of the grid. This calibration is effected by shifting a mode switch 49 from position 49-1 sequentially through positions 49-2, 49-3, and 49-4, and dwelling at each position for a position calibration. The mode switch shift is effected by means of a suitable internal program control.

At mode position 49-2, the sweep waveform is constituted by a simple sinusoidal voltage, such as that shown by waveform 62 in FIG. 7. A typical video waveform obtained by driving the scan with a sinusoidal sweep voltage with negative bias error is shown by form 63. The video waveform obtained with positive bias error is shown by form 64, and with zero bias error by video waveform 64.

FIG. 7 is specifically drawn for a sweep and the waveforms resulting from examining calibration block 59 placed at coordinates $X_{(0)}$-$Y_{(0)}$ on calibration grid 18. Similar waveforms can be obtained for calibrating the X sweep at blocks 57 and 61, or the Y sweep at blocks 58 and 60 by adding a DC offset to sinusoidal waveform 62. These positive and negative DC offsets are added to the sinusoidal sweep waveforms at mode switch positions 49-3 and 49-4.

Waveform 65 is the video waveform obtained when the scan is symmetrically swept around calibration block 59. The symmetry of this waveform signifies that no residual DC offset exists in the sweep generator 48, in the summing amplifier 51 and in the output amplifier 57 coupled thereto.

If an offset is found, as indicated by asymmetrical waveforms 63 and 64, the magnitude and sense of the offset is determined using known techniques for this purpose, as by phase detecting these waveforms relative to sinusoidal waveform 62. The DC signal resulting from such phase detection produces an offset control signal 54 that is injected into analog summing amplifier 51 to correct for offset to produce a symmetrical video waveform such as that illustrated in FIG. 7 as waveform 65.

The DC gain of the combined analog summing amplifier 51 and output amplifier 57 is calibrated by using blocks 57, 58, 60 and 61 on the calibration grid. A predetermined DC voltage is added to sinusoidal waveform 62 to produce DC calibration sweeps at mode positions 49-3 and 49-4. A positive voltage is added to provide a calibration input at mode switch position 49-3, and a negative input is provided to provide a calibration input at mode switch position 49-4.

For calibrating the X-sweep, the positive offset sinusoidal waveform will sweep the image of the calibration grid around calibration block 61. Proper DC gain is represented by a symmetrical video waveform such as waveform 65. Excess gain is indicated by an asymmetry such as video waveform 64 and insufficient video gain is indicated by an asymmetry such as video waveform 63.

A phase detection circuit identical to that used for measuring DC offset is used to determine the magnitude and sense of distortions in gain. The resultant error signals applied to the positive gain-control line 55 and the negative gain-control line 56 are injected into output amplifier 57. Because of the lack of perfect symmetry in normal scan circuits and their associated coils, in the magnetic fields and in the optics, and also because of the lack of symmetry thereby imposed on the associated electronic correction circuits, it is normally necessary to check the positive gain and the negative gain of the circuitry represented by analog summing amplifier 51 and output amplifier 57 and to make provision for separate gain controls for positive and negative excursions, such as inidcated by control inputs 55 and 56, respectively.

Input information furnished by a source 25 (see FIG. 2) serves to provide coordinates for the start of scan DC voltage source 50, and for end-of-scan level detector 52. Multiplexing input techniques for this purpose are well known in the art. Input information supplied to level detector 52, provides a sensing signal indicating when the sweep voltage has reached the point representing the end of the scan as defined by the nominal dimension on the appropriate line from input information source 25. As pointed out previously, level detector 52 produces a signal that acts to reset flip flop 38 and thereby command subtract device 41 to generate a difference signal to update digital sweep control storage register 45.

Special Sub Routines

FIGS. 8A to E illustrate the ability of the scanning system to examine the end of a cylindrical part 74 whose internal bore diameter and exterior diameter represent the ID and OD of the part. Let us assume that it is desired to determine the coordinates at the center of the circular bore and its ID. To find the ID, a series of horizontal search scans, such as those represented by numerals 75a to e in FIG. 8A, are run across the nominal center, starting with scan 75a just below the lowest position allowed by an acceptable tolerance and ending with scan 75e just above the highest allowed position. The X diameter of the bore is determined by the largest dimension measured in this search procedure. The X coordinate of the center of the bore is represented by the position of the bisector of the diametrical distance so determined.

Figure 8D:
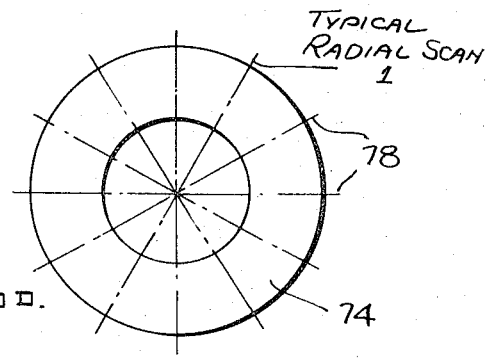
Figure 8B:
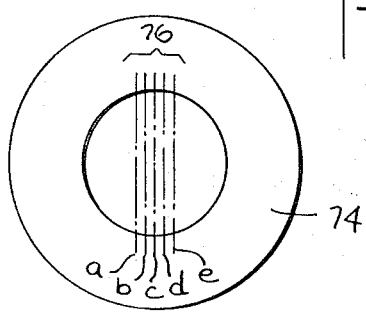

In a similar manner, the Y coordinate and Y diameter of the bore is found by a group of scans 76a to e, as shown in FIG. 8B. The coordinates of the center of the bore then are the intersection of the largest X diameter and the largest y diameter which have just been measured.

Figure 8E:
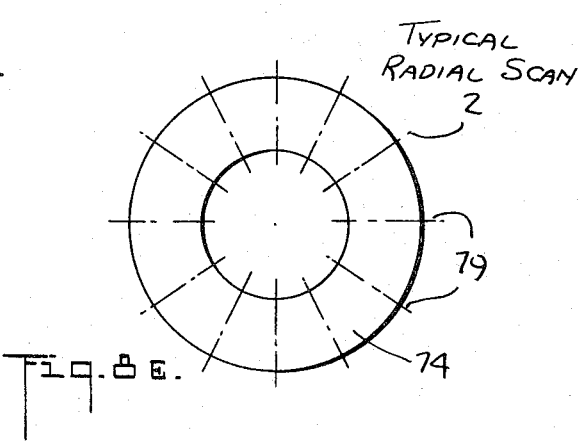
Figure 8C:
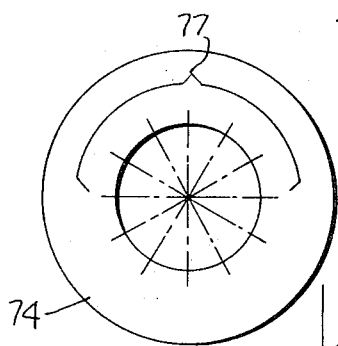

The circularity of the bore can be determined by running a large number of diameters 77 through the bore center just established, as shown in FIG. 8C. Variations in intercepts with the part across any of these diameters indicate a departure from circularity. In a similar manner, a deviation from symmetry of the outer diameter of the part and its total indicator readout (TIR) can be measured as shown in FIG. 8D by running a set of diameters 78 through the center by the procedures mentioned previously, and determining the lengths of these diameters as they intersect the outer surface of the part.

The concentricity of the inner diameter and the outer diameter can be determined by running a series of radial scans 79, as shown in FIG. 8E, across the ID and OD to measure the wall thickness of the part. Variations in thickness are directly indicative of the concentricity of the ID and OD.

Figure 8F:
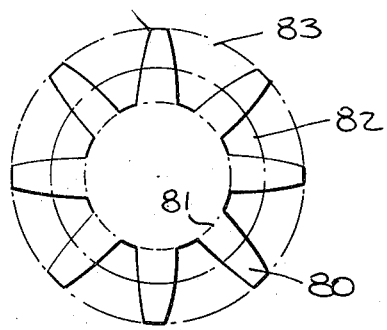

Referring now to FIG. 8F, there is shown the undulating outline of a very coarse gear which is to be measured. Circle 81 represents the root diameter of the gear, circle 83 represents the OD of the gear and circle 82 represents the nominal pitch diameter of the gear. A scan place on this pitch diameter can measure the tooth-to-tooth spacing of the gear and the various defects pertaining to a gear configuration which are based on tooth-to-tooth error.

Figure 8G:
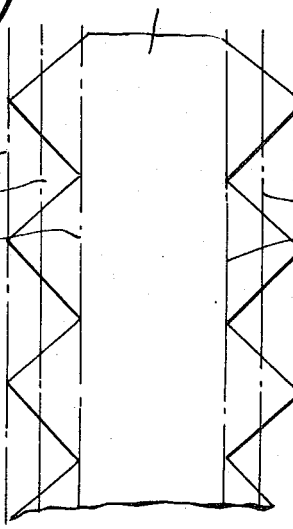
Figures 11A, 11B:
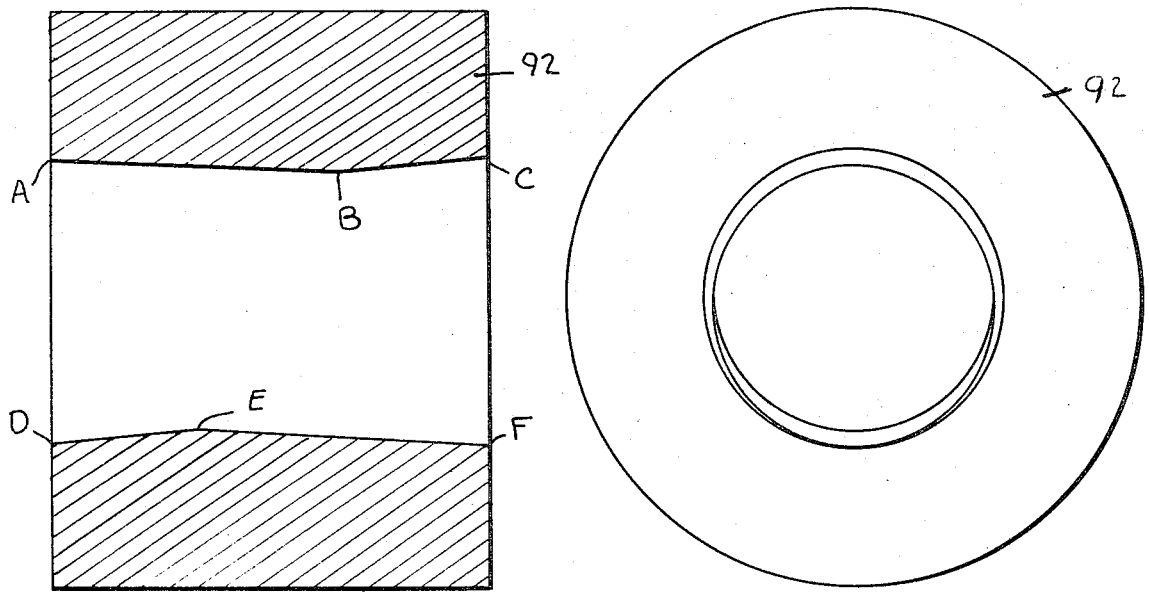
Figure 11C:
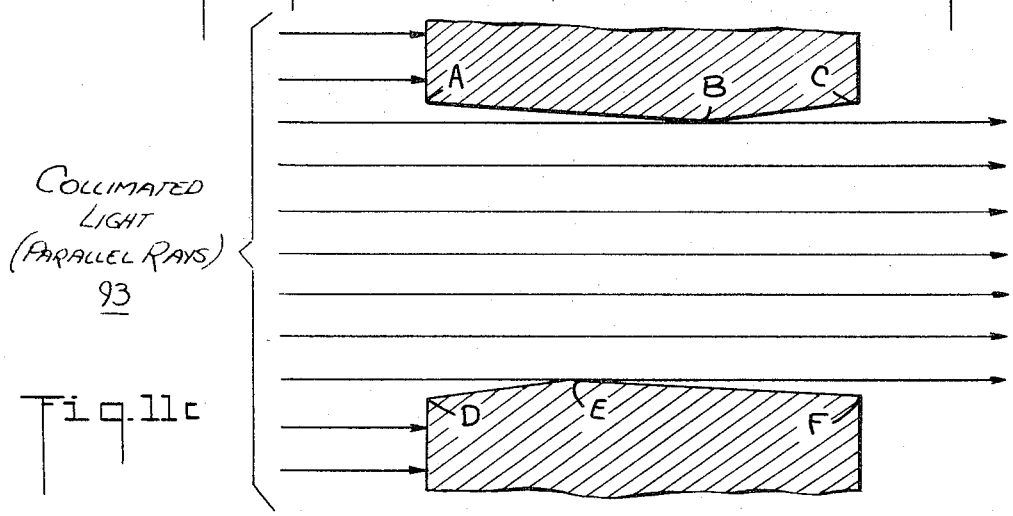
Figure 11D:
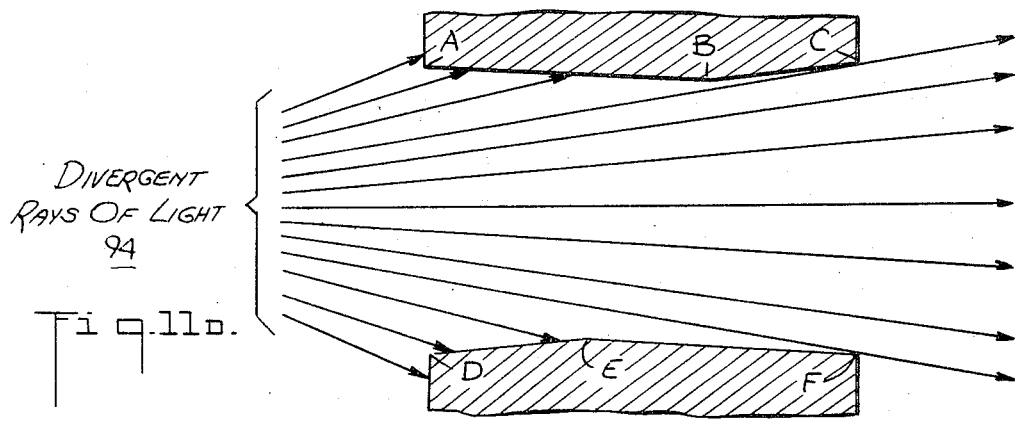

In a similar fashion, one may make measurements along the pitch diameter of a threaded part such as a screw which in FIG. 8G is represented in longitudinal cross-section. The parallel lines 85 which touch the peaks of the threads, represent the OD of the screw. The parallel lines 87 which touch the troughs of the threads, represent the root diameter, while the parallel lines 86 which intersect the threads, represent the pitch diameter. A scan running along lines 86 will measure variations in the threaded contour along this pitch diameter. This measurement can be carried out while the part is held stationary or while it rotates about its longitudinal axis. The latter measurement will afford a complete history of the variations in thread contour along the pitch diameter throughout the entire length of the threaded part for 360° of rotation.

Referring now to FIGS. 9A, 9B and 9C, there is illustrated another measuring technique made possible by the flexibility inherent in a deflectable photomultiplier scan. Curve 88, in these figures represents either the ID or the OD of a part whose radius of curvature and whose center of curvature is to be established. The exploratory waveform in FIG. 9A is represented by waveform 89, that in FIG. 9B by waveform 90 and that in FIG. 9C by waveform 91. These exploratory waveforms are constituted by a scan having a known radius of curvature and a known center of curvature. Superimposed on this curved scan is a high frequency modulation component.

The exploratory scan and the unknown curve 88 in FIG. 9A will have the same radius and center of curvature only when all of the high frequency cycles of the modulation component are intersected symmetrically by the curve being measured. However, curve 89 of the exploratory scan is at variance with the curve 88 being measured. Curve 89 has a larger radius of curvature and the intersection with curve 88 therefore starts and stops near the bottom of the high-frequency modulation component, as indicated at points $M_1$ and $M_2$.

Referring now to FIG. 9B, it will be seen that exploratory curve 90 has a smaller radius of curvature than curve 88 of the part being measured, and that its intersection with the part curve starts and stops at the top of the high frequency modulation component, as indicated by points $M_3$ and $M_4$.

In FIG. 9C, the exploratory curve 91 has the proper radius of curvature relative to the curve 88 of the part being measured, but its center is displaced in space from the center of part curve 88. Under these circumstances, the intersections with the high frequency modulation component start at the bottom thereby, as indicated by point $M_5$, and stop at the top, as indicated by point $M_6$.

In all of the examples shown in FIGS. 9A, 9B, and 9C wherein the exploratory curve deviates in terms of radius of curvature or center of curvature from the curve of the part being measured, the extent and direction of this deviation is determined by techniques well known in the art for generating an error signal of corresponding magnitude and sense. This error signal acts to control a closed servo loop to change the radius of curvature and the center of curvature of the exploratory scan to match those of the unknown scan.

Under relatively straightforward conditions where there are minimal problems in providing light, in presenting the part to the system and in carrying out the various measurements, the system can operate at a rapid rate, such as 100 scans per second, each scan effecting a single dimensional measurement. Under most circumstances, it may be necessary or desirable to calibrate the scan and optics in advance of each measurement, so that of the 100 scans per second, say 10 milliseconds will be taken up in calibration time and 10 milliseconds devoted to the actual measurement. Shifting the scan from one measurement position to the next can usually be performed in almost negligible terms, hence if 25 milliseconds is given over for calibration, measurement and movement of the scan to the next position, the system is then capable of carrying out forty highly calibrated measurements per second.

This is particularly useful in the following situations:

A. When it is necessary to make a large number of measurements on a complex machined part such as an eccentrically-shaped cam or machine casting:

B. When multiple measurements of the same dimension are required in a high speed production line. An example of this situation is a line producing roller bearings at a rate of five per second and where inspection requirements dictate measurement at several positions along the length of the roller;

C. When measurements of implied dimensions are called for, such as the pitch diameter of a thread or gear. In this situation, a reference surface must be erected. This reference surface must be carefully placed with respect to the unknown object, and measurements then made to specified portions of the reference surface. At present, physical wires are used to generate the reference surface. This entire procedure can be performed by a system according to the invention, under an appropriate computer program control, including the generation and use of "electronic wires" as references.

The surface of the part presented to the system must represent the dimensions to be measured and it must therefore be free of chips and other machining residue. Other than the requirement for cleanliness, no other special surface preparation is necessary and the system will operate with equal ease on parts whose surfaces are either brightly polished or have a dull or a black anodized finish.

Pattern Recognition and Tracking

It is possible to use the scanner 11 and its associated optics for pattern recognition purposes in accordance with the technique disclosed in my U.S. Pat. No. 3,593,286. In this patent a deflectable photomultiplier tube is used to provide a scan of an optical image of a pattern to establish the degree of similarity between the pattern and a reference pattern. Thus scanner 11 functions both to effect dimensional measurement of a part and for pattern recognition. This dual use of the scanner requires only a relatively small increment in the electronics associated with the system and yet affords the following additional features which are of great value in a device for measuring parts:

A. The part being measured need not be oriented precisely in order to perform the desired measurements. With the scanner functioning as the input device to a correlator in the manner disclosed in my earlier patent (see FIGS. 4, 5 and 6), the video information generated thereby can be used to align the scan to the displaced or rotated image of the part to be measured.

No mechanical movement is entailed in the operation, for scan alignment is effected electronically as described in my earlier patent. With the scan aligned in this manner, the coordinates of the measuring scan are offset and rotated by applying thereto the same offset and rotation correction voltages developed by using the scanner in a correlating mode. As a result, the measuring scan pattern is rotated and translated to the degree appropriate for the displaced image in its field of view.

B. By the use of image motion-compensation techniques, as described in connection with FIG. 11 and 12 in my earlier patent, one can track an object moving through the field of view. This is of particular value in making measurements on parts conveyed on a moving belt, for measurement can then be made in the part during the entire period the part remains within the field of view of the system. It is also useful in measuring parts that are allowed to rotate by rolling across this field of view, thereby facilitating measurement of the diameters of balls or cylinders and making it possible to carry out similar measurements that should be identical regardless of the orientation of the part.

By this tracking technique, one can measure out-of-round conditions and other deviations from symmetry without the need to determine the total indicator readout or similar readings. The simplest techniques for making this measurement is illustrated in FIG. 10 wherein part 69, moving across a flat surface 66, is observed by two separate scanners 67 and 71.

One scanner 71 which responds to an image generated by light rays 73 projected thereon by lens 72, tracks the part while it is moving across the field of view in the manner described in my earlier patent. The other scanner 67, using lens 68 and light rays 70 for measuring purposes, is slaved to the tracking scanner by means of inputs supplied from the tracking scanner to control input 54-1 and 54-2 in FIG. 5.

When slaved to track in this fashion, the measuring scanner 67 sees the image of the moving part stabilized within its scan, and it makes measurements just as if there were no actual movement of the image. It is to be noted that the nature of the calibration technique disclosed herein allows the measuring scan to be calibrated at each new position of the scan merely by using a standard sample and a hold circuit between the tracking scanner/correlator and the control input 54-1 and 54-2 (FIG. 5) of the measuring scanner.

When calibrating, the sample and hold circuits are put in the "hold" mode, so that calibration can take place with a static scan at approximately the position at which it will be for measurements. Then the sample and hold circuit is put in the "sample" mode wherein the measuring scan "catches-up" with the tracking scan, thereby stabilizing the moving image with respect to the measuring scan. With circuits of the type well known in the art, the time constants are such that the "hold" mode for calibration and the "slewing" mode for tracking can be accomplished with sufficient rapidity to permit the overall system operation to proceed at its normal rate of measurement.

ILLUMINATION TECHNIQUES

It is frequently desirable to be able to choose different planes in object space to generate the image to be measured on the face of the scanner assembly. Certain techniques have heretofore been employed to do this to a limited extent. In particular, collimated light can be used to afford a limited amount of control, as will now be explained in connection with FIG. 11. FIG. 11-A is a hollow cylinder 92 of tubular configuration shown in cross section. FIG. 11-B is the same cylinder shown in end view. The inner diameter is not a perfect cylinder; the upper section is somewhat thicker at the point B, and the lower section is somewhat thicker at the point E.

As shown in FIG. 11-C collimated light 93 used to measure the inner diameter of this cylinder would be intercepted at points B and E. The image generated by passing the collimated ray bundle through the inner diameter of this cylinder would indicate an inner diameter that is smaller than the left-hand diameter (AD) or the right-hand diameter (CF).

It is frequently necessary to obtain either diameter AD or diameter CF while illuminating the inner diameter of the cylinder with a light from the left of the cylinder. The image is to be viewed with a scanner placed on the right of the cylinder, with suitable optics between the right-hand side of the cylinder and the scanner to generate the required images. In FIG. 11-D, to see diameter CF while illuminating the cylinder from the left, it is necessary to cause the light rays 94 to diverge in a controlled manner. The angle of divergence can be determined geometrically. The divergence must be great enough so that the rays which exit from the right side of the ID of the cylinder have been intercepted by the diameter of interest, namely the diameter CF, and not by a diameter which is somewhat leftward of the diameter of interest.

In a similar fashion, to choose the diameter AD which is on the illuminated face of the cylinder, it is necessary to use illumination with a controlled degree of convergence as illustrated in FIG. 11-E. The amount of convergence can be determined geometrically; the requirement being that the rays 95 exiting from the right side of the ID of the cylinder be intercepted only by the diameter AD and by no surface to the right of AD.

Another measurement problem that arises in practice for which no practical solution exists today is that of measuring the thickness of a transparent material such as a glass slab 97 as shown in FIG. 12. If the physical configuration of the material to be measured permits it, techniques similar to those used for metal can be used. These include micrometers, height gauges, etc. However, it is common to generate glass shapes with highly convoluted and frequently closed wall configurations. The problem is peculiarly aggravated by the fact that the generation of these shapes is normally done by a blowing or sagging process during which it is extremely difficult to control the wall thickness of the glass being worked.

It is necessary, in order to insure the overall strength of the resulting object, to determine the wall thickness of the finished item. A method of making such measurements in a nondestructive manner under practical production conditions in accordance with the invention involves directing an incoming ray of light 96 toward the slab of glass 97, whose thickness is to be measured, so that two reflections are generated. One reflected ray indicated by numeral 99, results from a first surface reflection, and the second reflected ray identified by numeral 98, is a second surface (often called ghost) reflection.

It is quite obvious from examining the geometry shown in FIG. 12 that for a given angle between incoming ray 96, and the first surface of the slab of glass 97, the distance between the two reflected rays 98 and 99, is a direct measure of the thickness of the slab. The scanning technique for measuring disclosed hereinabove is directly applicable to measuring the distance between these reflected rays in order to provide a feasible commercial method of measuring glass thickness.

While there has been disclosed a preferred embodiment of a system in accordance with the invention, it will be appreciated that many changes may be made therein without departing from the essential spirit of the invention.

I claim:

1. An electro-optical scanning system for gauging the dimensions of a machined part and other fabricated objects and assemblies to determine whether the part meets predetermined manufacturing standards, said system comprising:

A. an electro-optical scanner having a light sensitive face;
   B. optical means including a fixed high intensity light source illuminating a part to be measured to project an outline of said part to be measured onto said face;
   C. a scan generator operatively coupled to said scanner to produce scan voltages generating a scan whose position and length are controllable to define a scan path which traverses those edges of the image of the part outline that constitute the terminal points of a dimension to be measured, whereby the scanner yields a video signal representing said dimension;
   D. an electronic clock generating periodic pulses at a constant rate;
   E. means to apply said video signal to said clock to gate the operation thereof to produce a train of pulses in the time interval between said terminal points;
   F. a counter coupled to said gated clock to count the number of pulses in said train to produce a test count representing said time interval;
   G. a reference-value storage register;
   H. an input information matrix coupled to said controllable scan generator and to said register to supply, in regard to each of the several part dimensions to be measured, information to said scan generator for producing a scan along a scan path appropriate to each part dimension and to supply to said register information regarding the counts appropriate to the nominal dimensions of each part dimension; and
   I. means comparing the test count yielded by the counter for each measuring scan with the reference count in said register representing the related nominal dimension, to produce an output signal indicative of the disparity between the part dimension measured and the nominal dimension.

2. A system as set forth in claim 1, further including reference means to modify said scan voltages to correct for the optical and electronic non-linearities of said system with respect to each dimension measured.

3. A system as set forth in claim 1, further including a calibration grid, means to project in place of said part outline an image of said grid onto said face to produce an image thereof covering the entire field of view, to define a reference dimension for each of the dimensions to be measured, and means to compare the dimension to be measured with the related reference dimension to determine the differential error introduced by the optical and electronic non-linearities of the system and to correct the voltage produced by said generator to compensate therefor.

4. A system as set forth in claim 3, wherein said means to project an image of said calibration grid in place of said part outline, is constituted by a beam splitter, means to direct an illuminated outline of said part onto one side of said splitter whereby one of the resultant beams is projected onto said face, and means to direct an illuminated image calibration grid onto the other side of said splitter, whereby one of the resultant beams is projected onto said face.

5. A system as set forth in claim 1, wherein said scanner is constituted by an image dissector tube whose face is formed by a photocathode, said tube including vertical and horizontal deflection means responsive to said scanning voltages.

6. A system as set forth in claim 1, wherein said information matrix is formed by a mini-computer dedicated to said system.

7. A system as set forth in claim 1, wherein said matrix supplies information to said register regarding the tolerances of said dimensions to be measured, and said comparison means provides an output signal which indicates whether the dimension measured is acceptable with respect to the related tolerance or is to be rejected.

8. A system as set forth in claim 7, wherein said matrix supplies information to said register with respect to various levels for sorting by dimension, and said comparison means provides a signal indicative of the sorting level to which the measured dimension is applicable.

9. An electro-optical scanning system for gauging the dimensions of a machined part or other fabricated objects or assemblies to determine whether the part meets predetermined manufacturing standards, said system comprising:

A. an electro-optical scanner having a sensitive face;
   B. a two-dimensional calibration grid;
   C. optical means to project either an outline of said part onto said face or an image of said grid thereon which covers the entire field of view;
   D. a scan generator operatively coupled to said scanner to produce scan voltages generating a scan whose shape, position and length are controllable to define, when the calibration grid image is present, a scan which travels a vectorial path set up to duplicate the vectorial path required to measure a dimension of interest, and when the part outline is present, a scan which travels a vectorial path, whereby the scanner output in the one instance represents a calibration path, and in the other a dimension path;
   E. an electronic clock generating periodic pulses at a constant rate;
   F. means to count the number of pulses generated by the clock during the time required to scan said calibration path to produce a calibration count;
   G. correction means coupled to scan generator and responsive to said calibration count to modify said scan voltages to correct for the optical and electronic non-linearities of said system with respect to the dimension measured;

H. means for determining the number of pulses generated by said clock during the time required to scan said dimension path to produce a test count; and I. means responsive to said test count to determine whether said dimension satisfies a manufacturing standard.

10. A system as set forth in claim 9, wherein said correction means includes means responsive to said calibration count to correct the time required to traverse the test vectorial path so that the time agrees with the known distance established by the calibration vectorial path.

11. A system as set forth in claim 9, wherein said correction means includes means for resetting the origin of the coordinates electrically established by said scanner and said scan generator to coincide with the reference origin established by said grid.

12. A system as set forth in claim 11, further including means for establishing known distances from said origin in the image plane and for displacing said scan so that it rests on the nominal position so determined in the image plane.

13. A system as set forth in claim 12, further including means for establishing the actual position of the displaced scan with reference to the reference position in the image plane, and means for correcting any difference between the position required for calibration of this displacement of the scan.

14. An electro-optical scanning system for gauging the dimensions of a machined part and other fabricated objects and assemblies to determine whether the part meets predetermined manufacturing standards, said system comprising:

A. an electro-optical scanner having a light sensitive face;

B. optical means including a fixed light source illuminating a part to be measured to project an outline of said part to be measured onto said face;

C. a scan generator operatively coupled to said scanner to produce scan voltages generating a scan whose position and length are controllable to define a scan path which traverses those edges of the image of the part outline that constitute the terminal points of a dimension to be measured, whereby the scanner yields a video signal representing said dimension;

D. means to derive from said video signal a test value indicative of said dimension;

E. a reference-value storage register;

F. an input information matrix coupled to said controllable scan generator and to said register to supply, in regard to each of the several part dimensions to be measured, information to said scan generator for producing a scan along a scan path appropriate to each part dimension and to supply to said register information regarding the reference values appropriate to the nominal dimensions of each part dimension; and G. means comparing the test value derived from said video signal for each measuring scan with the reference value in said register representing the related nominal dimension, to produce an output signal indicative of the disparity between the part dimension measured and the nominal dimension.

* * * * *